Figure 1:
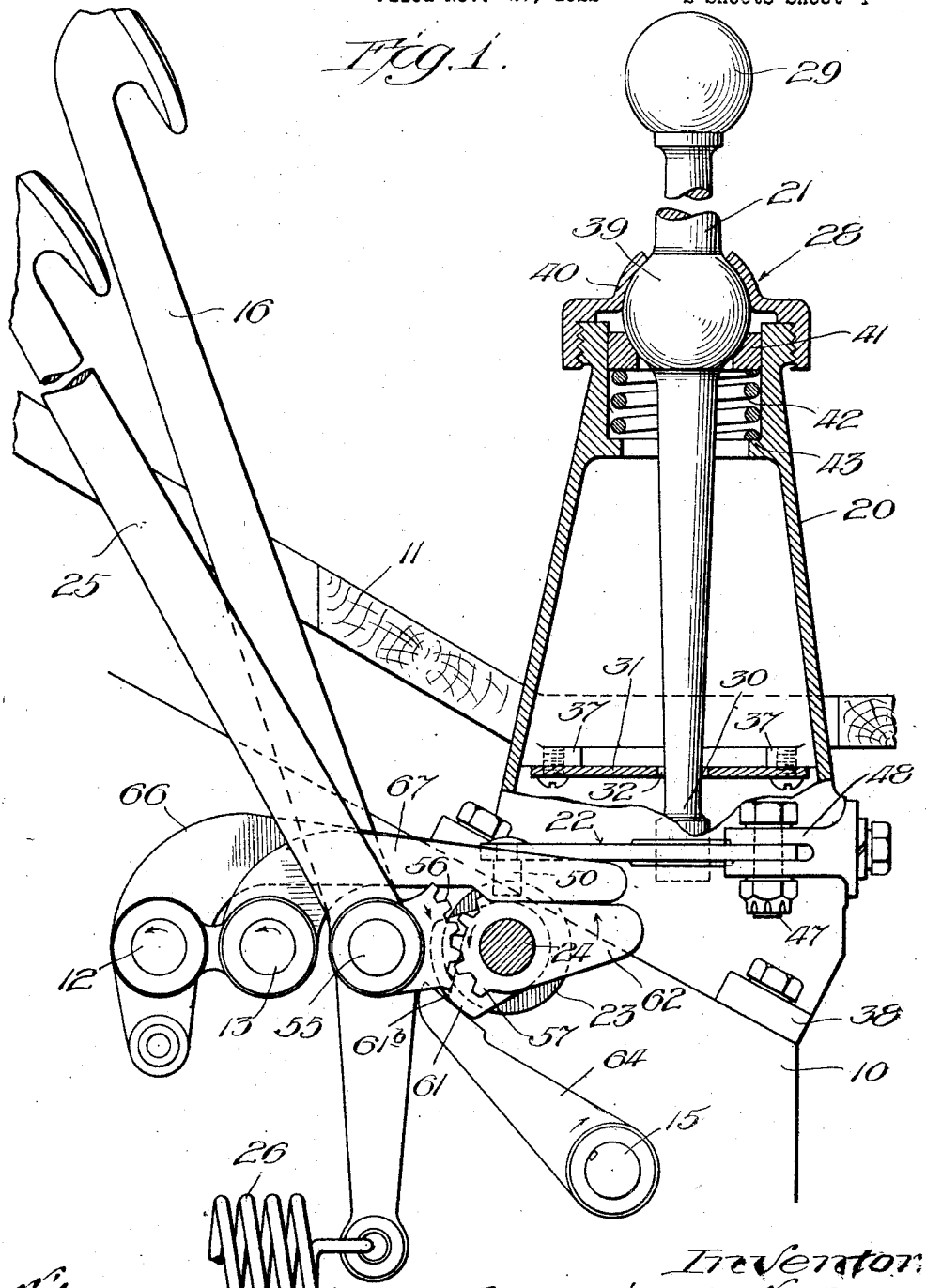

Dec. 15, 1925.  1,565,876
F. G. WACKER
OPERATING MEANS FOR AUTOMOBILE TRANSMISSION GEARING
Filed Nov. 27, 1922   2 Sheets-Sheet 1

Witness:
Harry S. Gaither

Inventor:
Frederick G. Wacker
by Rector Hibben Davis & Macauley
attys

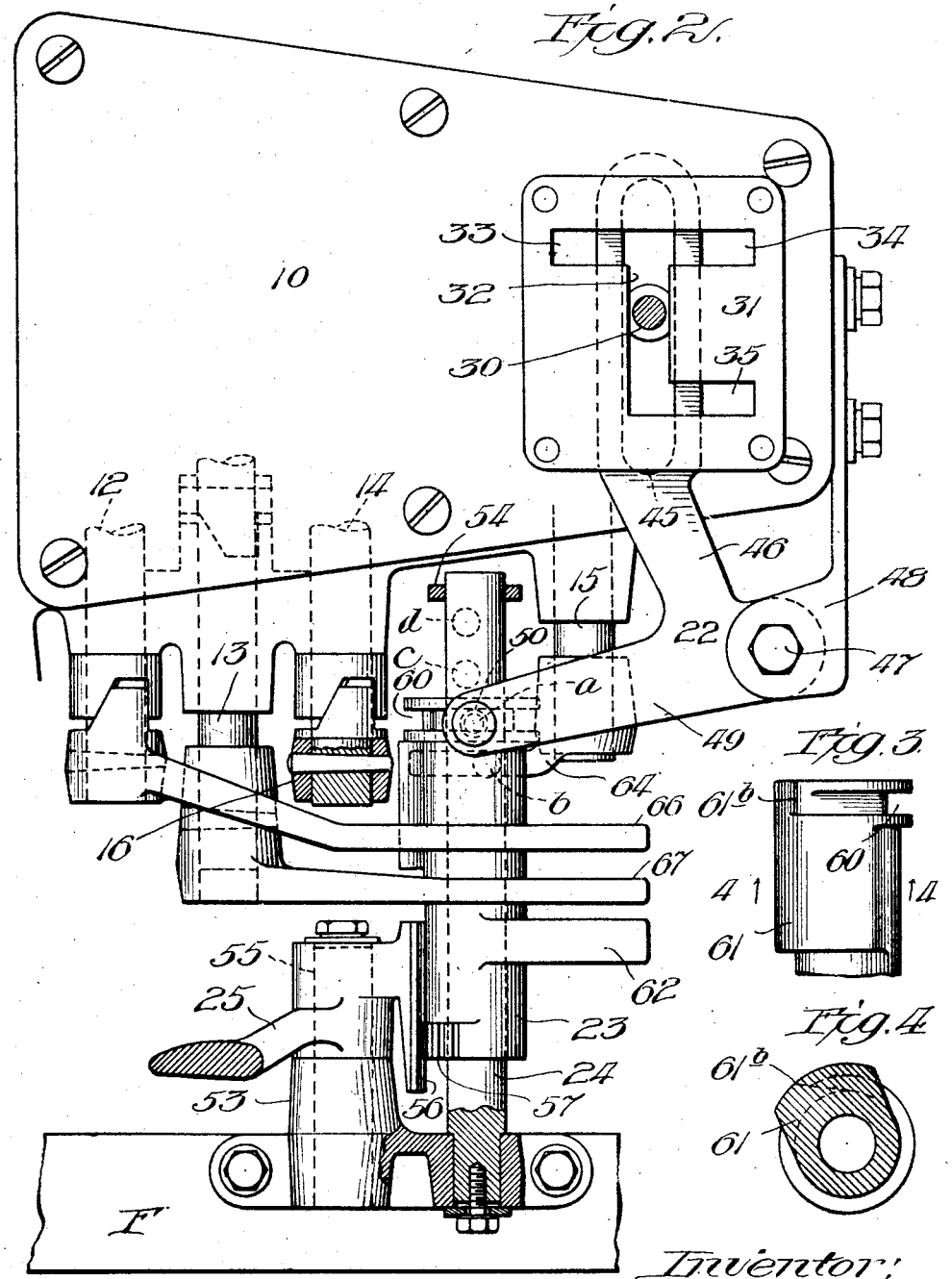

Patented Dec. 15, 1925.

1,565,876

UNITED STATES PATENT OFFICE.

FREDERICK G. WACKER, OF CHICAGO, ILLINOIS.

OPERATING MEANS FOR AUTOMOBILE TRANSMISSION GEARING.

Application filed November 27, 1922. Serial No. 603,661.

*To all whom it may concern:*

Be it known that I, FREDERICK G. WACKER, a citizen of the United States, residing at Chicago, in the county of Cook and State of Illinois, have invented certain new and useful Improvements in Operating Means for Automobile Transmission Gearing, of which the following is a specification.

My invention relates to means for controlling and operating the transmission mechanism of automobiles, and has for its particular object to provide a set of instrumentalities, intended especially for use in connection with the planetary transmission of "Ford" automobiles, so constructed that neutral setting and the gear selection and operation may be effected by means of a hand operated control lever and a foot-operated pedal, instead of being subject only to foot control by two pedals (with retention in "neutral" dependent on a hand-brake lever) as in the normal "Ford" construction.

A further object of my invention is to provide such equipment in a form which will be simple, efficient, inexpensive and easily installed, and which may be sold as a set of parts constituting a "Ford accessory".

Other objects of my invention are to provide novel and desirable construction and desirable mode of operation in the controlling and operating mechanism of the character described.

With a view to obtaining these and other objects which will become apparent to those skilled in the art from the following specification, my invention consists in the features of construction and combinations and relation of parts hereinafter set forth and claimed, reference being had to the accompanying drawings wherein I have represented a single embodiment of my invention applied to certain standard parts of a Ford automobile.

In said drawings Fig. 1 is a side elevation with parts in section, showing the equipment in position on the car; Fig. 2 is a plan view with parts broken away; Fig. 3 is an elevation of a fragment of the cam-sleeve and Fig. 4 is a section on line 4—4 of Fig. 3.

In the well known "Ford" automobile the planetary transmission mechanism which is housed in transmission casing 10 below the floorboard 11 of the car is adapted to afford a "neutral" position and two forward speeds (slow and high) which are all controllable by a single three-position foot pedal in the normal equipment of the car, and further to afford a reverse connection, to control which a second foot pedal is normally provided. In such standard "Ford" transmission, there project from the left side of the casing 10 four shafts, which respectively are called the reverse shaft, 12; the slow speed shaft, 13; the service brake shaft, 14; and the clutch lever shaft, 15. The particular planetary transmission mechanism of Ford cars, controllable by these shafts, is too well known to need specific illustration and description, and therefore is not shown herein; but suffice it to say that when the shafts 12, 13 and 15 stand in the positions shown in Fig. 1 the transmission mechanism is "in neutral"; but when shaft 15 is rocked clockwise, as indicated by the arrow, high speed connection is established through the transmission to the propeller shaft, while rocking of the shaft 12 or shaft 13 in counter clockwise direction, as shown by the arrows, will respectively establish reverse gear connection or low speed gear connection through the transmission to the propeller shaft. Therefore in its embodiment as an accessory to "Ford" automobiles, the construction herein shown has only to do with manipulation of these shafts already present in the standard "Ford" construction. Further, it will be understood, the standard parts within the transmission case provide springs that act on the shafts 12, 13 and 15, urging shaft 15 clockwise toward active position and urging shafts 12 and 13 clockwise toward inactive positions. The service brake pedal 16 is mounted on shaft 14, and these elements of the standard equipment need not be disturbed. In preparing the "Ford" car for application of the accessory set of parts, the normally-present reversing pedal and clutch pedal will be removed together with the connections from the clutch pedal to shaft 15, and the appliances hereinafter described will be employed as the sole means of controlling and operating the three shafts 12, 13 and 15.

Upon the inclined top of the transmission case 10 I mount the support or pedestal 20 for the transmission-control lever or shifter lever 21. This lever 21 is movable to right and left, and forward and back, (substantially after the usual fashion of transmission-gear shafting levers for other makes of automobiles) and acts through a suitable connector 22, such as a horizontally disposed bell crank lever selectively to govern the positioning of a controlling element 23 in one direction. According to such selective positioning the element 23 determines which of the shafts 12, 13 or 15 is to be operated. Such element 23 also is capable of movement in another direction, to effect the operation of the selected shaft, under the actuation of a foot pedal and consequently the general mode of changing transmission conditions is the same as is usual in makes of automobiles other than Fords; namely, the driver presses out a foot pedal, then shifts the hand lever to proper selective position and then releases the foot pedal to finally establish the desired condition of neutral, slow speed, high speed, or reverse.

Specifically this controlling element 23 preferably takes the form of a cam-equipped sleeve that is longitudinally slidable on a fixed supporting shaft 24 by means of the connector 22, to any one of four selective positions, said sleeve being oscillatable about its supporting shaft in any such selected position. The controlling element 23, in all of its selective axial positions, has operative connection with a foot pedal 25 (substituted for the normal "clutch pedal" of the Ford car) in such fashion that when the foot pedal is pressed forward it brings the cam sleeve element or controlling element 23 to idle rotative position as shown in Fig. 1, and when such pedal is released, to be retracted by a spring 26, the cam sleeve 23 is rotated to active position wherein it may actuate in selected shaft (12, 13 or 15) to establish the desired driving relation between the engine shaft and the propeller shaft through the intervening planetary transmission. Thus, in general, selection of the operation to be effected on the several shafts of the transmission is dependent on movement of the control lever 21 while the cam-sleeve is in idle rotative position, and actuation of any transmission shaft pursuant to such selection is dependent upon rotation of such sleeve to active position due to the return of the foot lever 25 by action of spring 26.

In the specific construction shown the control lever 21 is mounted between its ends by universal joint 28, so that its handle 29 may be moved to right and left and forward and back, the lower end of the lever, at 30, cooperating within the pedestal 20 with a guide plate 31 that limits the movements of the lever. This plate is shown as having a cross-slot 32, to the middle of which the lower portion 30 of lever 21 will be brought for "neutral" position, the right end of slot 32 communicating with "high speed slot" 33 and "reverse slot" 34 that respectively extend forwardly and backwardly from the cross-slot, while the left end of cross-slot 32 connects with the rearwardly extending "slow speed slot" 35. Thus lever 21 may be positioned in any one of the four stations just described. The guide plate 31, so formed, may be screwed to lugs 37 that are cast on the inside of the pedestal structure 20, which, in turn, is provided with lugs 38 to be bolted to the inclined top of the transmission casing 10. The universal joint for the control lever 21 is preferably provided by forming on the lever a ball enlargement 39 overlain by a ball-cap 40 that is threaded onto the top of the pedestal 20, there being within the pedestal a bearing ring 41 for the ball, having a parti-spherical recess to engage the ball formation, this ring being supported on a stout spring 42 that is seated on the shoulder 43 formed in the pedestal.

The lower extremity of the control lever 21 engages a cross-slot 45 in one arm 46 of the bell crank lever 22 which constitutes the preferred form of connector, this lever being pivoted as at 47 in a bracket-projection 48 of the pedestal and having a forwardly extending arm 49 which carries a pin 50 for axially shifting the cam-sleeve, or controlling element, 23. It will be apparent, now, that as the lower end 30 of the control lever 21 is shifted from the "neutral" position shown in Fig. 2 into the high speed slot 33, the pin 50 and cam-sleeve 23 will be shifted from station $a$ to station $b$ (Fig. 2) while movement of the said lever end 30 into slow speed slot 35 or reverse slot 34 respectively will bring the pin 50 and the cam to the stations $c$ or $d$.

For mounting shaft 24, and also the clutch pedal 25, I preferably provide a bracket 53 secured to the automobile side-frame F, the shaft 24 extending in fixed position between this bracket and any suitable support for its inboard end, such as in bracket 54 secured to the transmission casing, or to a bearing aperture in the side of the transmission casing. The foot pedal 25 is mounted on the short stub shaft 55 which also is secured in the casting 53, and the pedal lever may have formed upon its hub a wide-faced gear sector 56, arranged to mesh with a narrow-faced gear sector 57 formed on the cam sleeve 23. These two gear sectors remain in engagement to whatever position, axially of the shaft 24, the cam sleeve 23 may be slid, so that rocking operation of the cam sleeve may be imparted by the clutch pedal in any of the four selective positions of the cam sleeve.

The controlling element, or cam sleeve 23, has a groove 60 to receive the pin 50 so that the sleeve may be moved axially by the bell crank lever 22, and for actuation of the respective shafts of the transmission gearing said sleeve has two cam-projections 61 and 62. The first said cam 61 is arranged to cooperate with a lever 64 that is fastened on the transmission shaft 15. This cam's function is to hold the shaft 15 in the idle position shown in Fig. 1 (against the tension of the shaft-impelling spring) so long as the cam sleeve is in idling rotary position regardless of the axial station occupied by the cam sleeve, and also to hold said lever arm 64 in said idle position when the cam sleeve is rotated to active position while in any one of its stations corresponding with neutral position, low speed position, or reverse position of the controlling lever. Therefore, as best shown in Figs. 3 and 4, cam 61 may preferably be formed as an elongated cam sector which is of peripheral extent somewhat greater than the angle of oscillation of the cam sleeve throughout all that portion of its length which may co-act with lever 64 in several axial positions of the cam sleeve, but which is cut away to a short angular dimension, as at 61$^b$, at that end of the cam which will register with lever 64 when the cam sleeve is moved to its high speed station, $b$. Thus it is only when the cam sleeve is moved to high speed station, and then is rocked clockwise by the return of foot lever 25 to active position, that the peripherally-short cam-portion 61$^b$, slipping from under lever 65, permits the latter to be rocked in the direction indicated by the arrow in Fig. 1, thereby to establish high speed connection through the transmission gearing. The other cam 62 may be simply a projecting finger which may be brought, by longitudinal sliding of the sleeve 23, into register with either of two lever arms 66 and 67 which respectively are fastened to the shafts 12 and 13 and which extend across and above the cam sleeve. When the cam sleeve is slid to reverse station ($d$) this cam 62 lies directly under the lever 66 for the reverse shaft 12 and rocking of the sleeve to active position will raise the lever and establish the reversing connections in the transmission gearing. In the same fashion movement of the cam 62 to position beneath slow speed arm 67 of shaft 13 and subsequent rotary movement of the sleeve will rock the shaft 13 thereby to establish the slow speed gear-ratio of the transmission mechanism.

In specific résumé my equipment provides three lever arms 66, 67 and 64 to be fastened to the reverse shaft 12, slow speed shaft 13 and "clutch shaft" 15 of a "Ford" transmission; a sleeve 23 slidable to four stations, namely "neutral," reverse, slow speed and high speed; cams on said sleeve which will act on any one of said levers 66, 67 or 64 when the sleeve is rotated to active position while positioned in appropriate station but will leave all of said levers unaffected when the sleeve is so rotated while in "neutral" station; a hand lever 21 working through a slotted guide plate and controlling, by means of bell crank lever 22, the selective axial movements of said cam-sleeve 23, and a foot pedal 25 constantly gear-connected to the cam-sleeve for rocking it between active and inactive positions.

It will be understood that the hub-portions of the three lever arms 66, 67 and 64 which replace normal "Ford" parts should be exact duplicates of the hubs of the parts that they replace.

It will be understood that while I have shown and described a single embodiment of my invention for purposes of disclosure many changes in construction and arrangement may be made without departure from the spirit of my invention within the scope of the appended claims.

I claim:

1. Gear-shifting mechanism comprising, in combination with a plurality of parts to be moved, a controlling element bodily movable to selective positions for respective co-action with said parts to be moved and movable angularly to actuate the selected part, a hand-operatable, universally-movable, vertically-arranged control lever operatively connected with the said controlling element to bodily move it to selective position, and a pedal for moving said controlling element angularly to actuate the selected part.

2. Gear-shifting mechanism comprising, in combination with a plurality of parts to be moved, a controlling element shiftable axially to selective positions for respective co-action with said parts to be moved and movable angularly in any such axial position to actuate the selected part, a universally movable vertically arranged lever operatively connected with said controlling element to move it to different axial stations, and a pedal operatively connected with said controlling element in all of its axial stations for angularly moving said element.

3. Structure as set forth in claim 2 combined with a spring normally positioning said pedal to hold said controlling element in idle angular position.

4. Gear-shifting mechanism comprising, in combination with a plurality of transmission-gear shafts to be moved, arms on said respective shafts, a hand operatable, vertically-disposed, universally-movable control lever, an actuating pedal, and means movable bodily by said hand lever to be conditioned thereby to co-act selectively with any said arm and operatively associated with the actuating pedal to be rotated thereby for actuating said selected arm.

5. Gear-shifting mechanism comprising, in combination with a plurality of transmission-gear shafts to be moved, arms on said respective shafts, a vertically disposed universally movable hand lever, an actuating pedal, and means for moving any one of said arms including a structure operatively associated with the hand lever to be conditioned by movement of the latter to act on any selected arm and operatively associated with the pedal to be moved by the latter to actuate said arm.

6. Gear-shifting mechanism comprising, in combination with a plurality of transmission-gear shafts to be moved, a controlling element movable in one direction to selective positions for control of said shafts and movable in another direction to actuate the selected shaft, means for establishing operative connection between said control element and said shafts in the different selective positions of said element, a vertically arranged universally movable hand lever, operative connections between said lever and said controlling element for moving the latter in the first said direction, a pedal, and operative connection between said pedal and said controlling element for moving the latter in the second mentioned direction while in any of its selective positions.

7. Gear-shifting mechanism for automobiles which have a planetary transmission providing a casing and three projecting shafts to be rocked, comprising a pedestal structure attachable to said casing, a control lever vertically mounted in said pedestal for universal movement to four selective positions, arms attachable to said three shafts, a pedal, and means, jointly controlled by said lever and said pedal, operatable by the former to selectively co-act with any said shaft arm and by the pedal to actuate said shaft arm.

8. Gear-shifting mechanism for automobiles which have a planetary transmission providing a casing and three projecting shafts to be rocked, comprising a pedestal structure attachable to said casing, a vertically arranged control lever universally mounted in said pedestal for manual movement to four selective positions, arms attachable to said three shafts, a cam sleeve having cam surfaces adaptable to be positioned for co-action with selected ones of said arms and to act upon the selected arm when rocked to active position, operative connections between said control lever and said cam sleeve for moving the latter to position for co-action with any said arm or neutral position corresponding with the four positions of said control lever, a pedal, and operative connection between said pedal and said cam sleeve for rocking the latter while in any of its positions for co-action with said respective shaft-arms.

9. Structure as set forth in claim 8 combined with a spring normally maintaining said pedal in position to hold said cam sleeve in idle angular position.

10. Structure as set forth in claim 8 provided with a bell crank lever pivoted to a pedestal and co-acting with the cam sleeve and the control lever in the operative connection of the last said parts.

11. Structure as set forth in claim 8 and providing constantly meshing gears interposed between the pedal and the cam sleeve in the operative connection of said parts.

12. Gear-shifting mechanism for automobiles which have a planetary transmission providing a casing and projecting shafts to be rocked, comprising a pedestal structure attached to said casing, a control lever vertically mounted in said pedestal for universal movement to different selective positions, arms attached to said projecting shafts, a controlling element movable in two directions and having surfaces adapted to be positioned for co-action with the selected ones of said arms according to movement of said element in one direction and to act upon the selected arm when said element is moved to active position in the other direction, operative connections between said control lever and said controlling element for moving the latter in the first said direction, a pedal, and operative connections between said pedal and said controlling element for moving the latter from idle to active position.

FREDERICK G. WACKER.